United States Patent
Lin

(10) Patent No.: US 7,340,091 B2
(45) Date of Patent: Mar. 4, 2008

(54) METHOD FOR ADJUSTING IMAGE CONTRAST

(75) Inventor: Albert Lin, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 551 days.

(21) Appl. No.: 11/050,772

(22) Filed: Feb. 7, 2005

(65) Prior Publication Data

US 2005/0213814 A1 Sep. 29, 2005

(30) Foreign Application Priority Data

Mar. 23, 2004 (TW) .............................. 93107846 A

(51) Int. Cl.
*G06K 9/00* (2006.01)
*G06K 9/40* (2006.01)
*G06K 9/36* (2006.01)

(52) U.S. Cl. ...................... 382/169; 382/274
(58) Field of Classification Search ................ 382/162, 382/164, 167–169, 172, 254, 272, 274, 276, 382/277, 284; 358/515, 518, 519, 520, 522, 358/530

See application file for complete search history.

(56) References Cited

U.S. PATENT DOCUMENTS

| | | | | |
|---|---|---|---|---|
| 5,799,106 A | * | 8/1998 | Mooney et al. | ............. 382/172 |
| 6,148,103 A | * | 11/2000 | Nenonen | ..................... 382/169 |
| 6,694,051 B1 | * | 2/2004 | Yamazoe et al. | ........... 382/167 |
| 7,199,776 B2 | * | 4/2007 | Ikeda et al. | .................... 345/89 |
| 2005/0163368 A1 | * | 7/2005 | Hanamoto | .................. 382/162 |
| 2005/0213814 A1 | * | 9/2005 | Lin | ............................ 382/169 |
| 2006/0110022 A1 | * | 5/2006 | Zhang et al. | ................ 382/132 |

* cited by examiner

*Primary Examiner*—Amir Alavi
(74) *Attorney, Agent, or Firm*—Rabin & Berdo, P.C.

(57) ABSTRACT

A method for adjusting image contrast has the steps of constructing a luminance histogram of an original image; acquiring an image characteristic of the luminance histogram; judging whether there is a peak wave or deviation of luminance existed in that image characteristic; determining a control point after performing a specific algorithm; deriving a linear equation from the control point and a contrast adjusting value in a Cartesian coordinate system; establishing a gamma table from the correspondent relationship between the horizontal and vertical axis in the coordinate, where the relationship can be calculated according to the linear equation; and finally generating a luminance value from the gamma look-up table using the input luminance of each pixel in the original image.

23 Claims, 6 Drawing Sheets

METHOD FOR ADJUSTING IMAGE CONTRAST

BACKGROUND OF THE INVENTION

1. Field of the Invention

The present invention particularly discloses a method for intensifying a digital image contrast of an image processing software.

2. Description of Related Art

The contrast of an image is regarded as the difference in brightness between the light and dark areas, i.e. the brightness distribution of the image. Usually, an image with low contrast or high contrast is considered as having poor contrast. An image with high contrast suffers from coarse luminosity and one with low contrast looks faded. Both conditions with high or low contrast are unsatisfactory to human vision. Therefore, an image with good contrast indicates that the luminosity is distributed uniformly over the color levels. Nevertheless, in the image contrast adjusting method of current image processing software, the wide contrast adjusting range of the image often causes the image to be excessively bright or dark and thus distorted.

In view of aforementioned drawback of the prior art, the present invention provides a method for adjusting image contrast that can adjust the contrast effect of an image smoothly.

SUMMARY OF THE INVENTION

Broadly speaking, the present invention discloses a method for adjusting image contrast, which provides a faster and smoother method for adjusting image contrast according to the image's characteristic. Then a better image contrast adjusting method is provided.

For the main purpose recited above, the method comprises the following steps: constructing a luminance histogram of an original image; analyzing an image characteristic of the luminance histogram and determining a control point; acquiring a contrast value; deriving a linear equation with the connection between the control point and contrast value in a Cartesian coordinate system; establishing a gamma table based on the linear equation; and adjusting the contrast of the original image according to the gamma table.

The established gamma table can reflect the characteristic of the original image, and further the brightness of the image can be distributed uniformly since the original image is adjusted accordingly.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF DRAWINGS

The present invention will be readily understood by the following detailed description in conjunction accompanying drawings, in which.

DETAILED DESCRIPTION OF THE PREFERRED EMBODIMENTS

The numerical information of an image is often used to analyze the characteristics of the image, and to determine the image processing quality. More particularly, the present invention provides a method for adjusting image contrast to adjust the image contrast with enhancement or abatement according to an image histogram.

An image characteristic distribution used in the present invention is a luminance histogram, in which the number of the pixels distributed in different luminance regions is recognized. An abscissa of the luminance histogram is the luminance ranging from 0 to 255, namely the 8-bit luminance, and an ordinate of the histogram is the number of pixels with the same luminance.

Figure 1A:
FIG. 1A shows a schematic diagram of an original image.
Figure 1B:
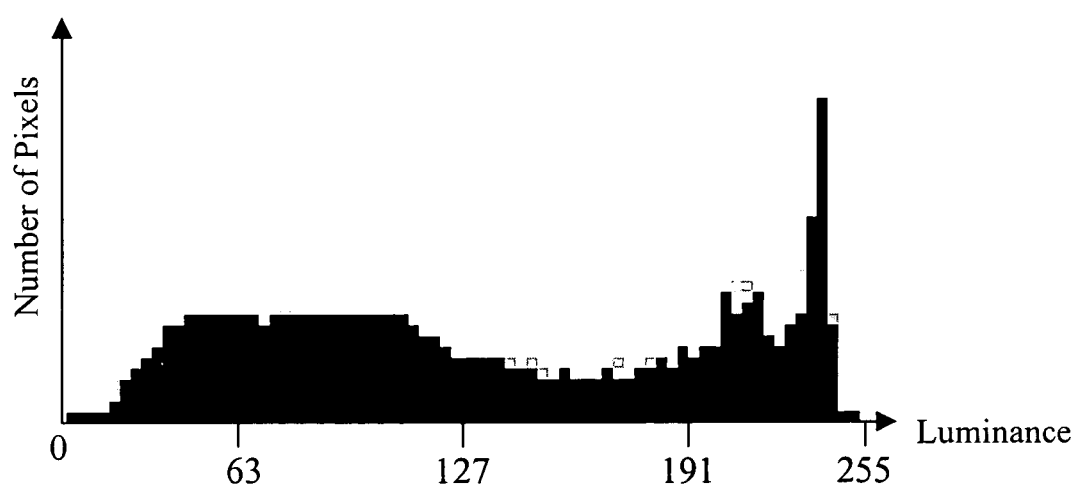
FIG. 1B shows a luminance histogram of the FIG. 1A.

Reference is made to FIG. 1A, which shows a schematic diagram of an original image, and the corresponding luminance histogram calculated by a computer is shown in FIG. 1B. The method of the present invention can determine an image to be bright-shift or dark-shift in the histogram of FIG. 1B, and adjust contrast of the original image by means of the linear equation F0 in the Cartesian coordinate system of FIG. 2.

Figure 2:
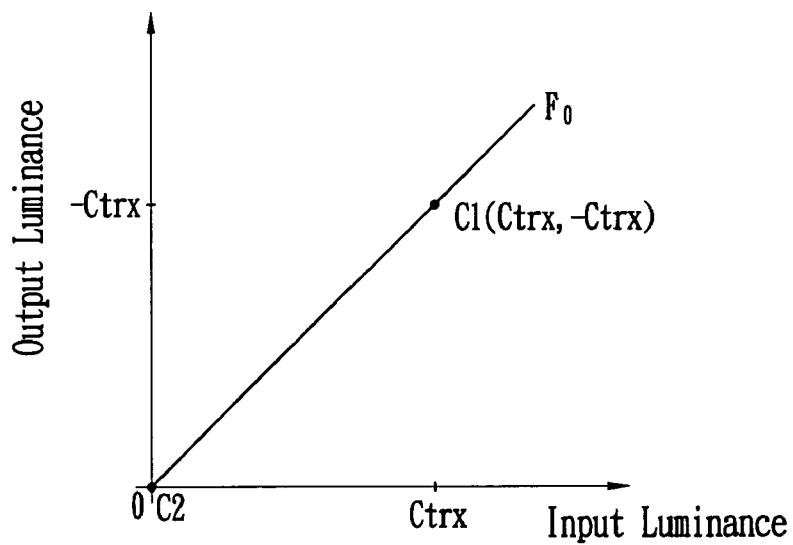
FIG. 2 shows a linear equation with zero contrast value in the Cartesian coordinate of the present invention.

The relationship between the abscissa and the ordinate shown in FIG. 2 is the corresponding functional relation of the luminance, in which the abscissa stands for an input luminance and the ordinate stands for an output luminance after adjusting the contrast. Moreover, the linear equation F0 is regarded as a mapping function, and the output luminance is acquired corresponding to the input luminance through the mapping function thereof.

For speeding up the performance of the image processing, the present invention employs a linear equation as the aforementioned mapping function. In FIG. 2, the linear equation F0 can be derived since a given control point C1 and a contrast value C2 are the two variables of a straight line, in which the control point C1 is selected with reference to the coming detailed description and the selected range of contrast value C2 is located in (0~Ctrx, 0) or (0, 0~-Ctrx).

Otherwise, an image can be decomposed into a plurality of pixels, which are the elementary image elements during the image contrast processing. These pixels are located in the corresponding position of the image by modifying the luminance level of the input pixels according to the mapping function mentioned above. The definition of the mapping function of the image processing is recited as following description:

The luminance of one pixel in the histogram is $$\text{Lum}=(\text{byte})(r*0.299+g*0.587+b*0.114) \qquad (1).$$

The number of total pixels in the histogram is $$\text{Total}=(\text{number of pixels of the image's length})* \\ (\text{number of pixels of the image's width}) \qquad (2).$$

The summation of the image's luminance is $$TotalIum = \sum_{i=1}^{Total} Lum_i. \quad (3)$$

The mean value of luminance of the image is mean=(int)((Totallum+(Total/2))/Total)    (4).

The standard deviation of the image's luminance is $$StdDeviation = \sqrt{\frac{\sum_{i=0}^{Total}(Lum_i - Mean)^2}{Total}}. \quad (5)$$

The clipped weight center of the image's luminance histogram is $$WeightCenter = \sum(x_i * m_i) / \sum m_i. \quad (6)$$

Where i=0~255 and i is not equal to the maximum of the luminance value of the peak wave but is the series of the luminance value after clipping the peak wave of the luminance histogram; x is the abscissa of the clipped luminance histogram; and m is the ordinate.

Figure 3:
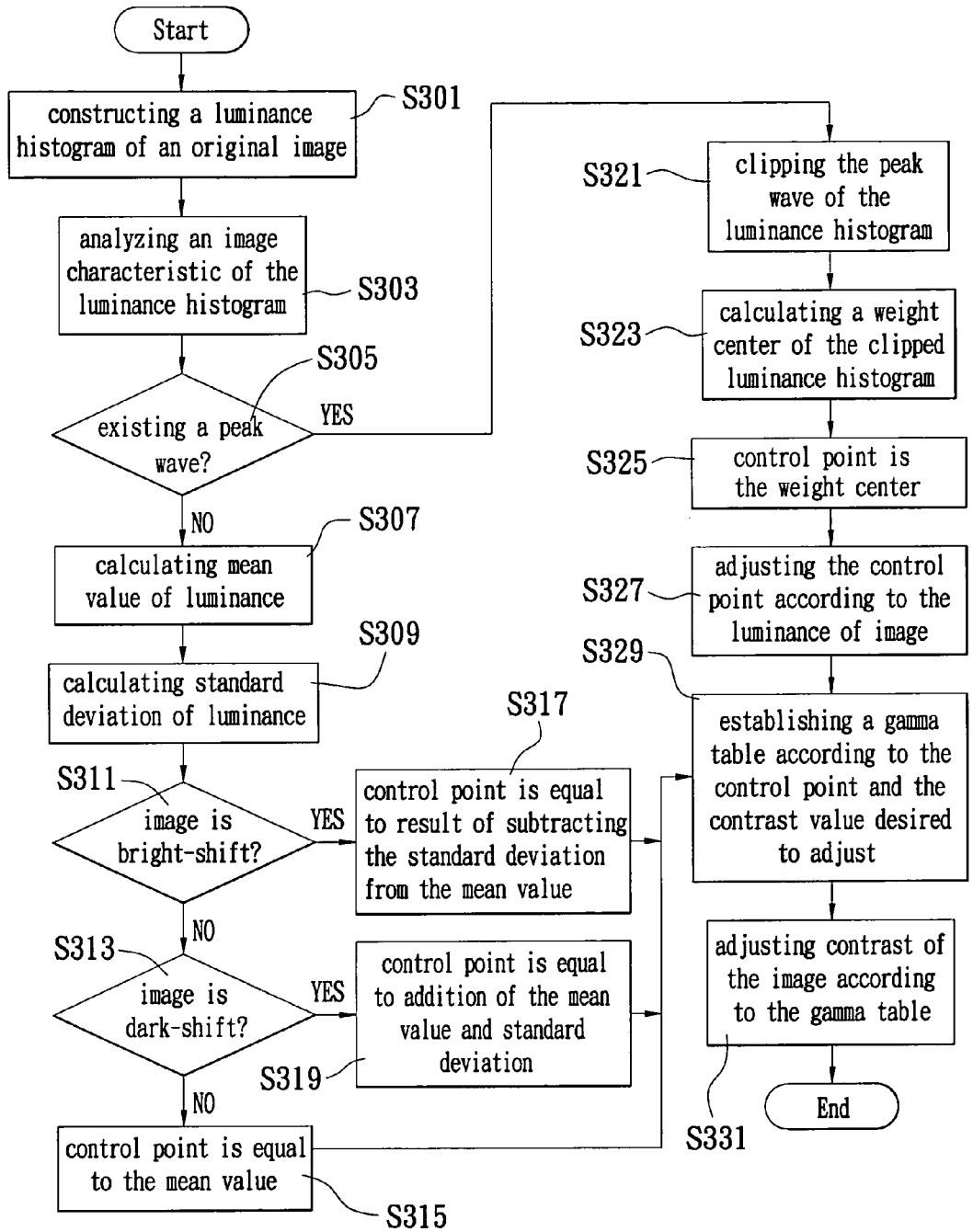
FIG. 3 is a flow chart of the method for adjusting image contrast of the present invention.

FIG. 3 shows a flow chart of the method for adjusting image contrast of the present invention, in which the method comprises the steps described below.

First at all, a luminance histogram of an original image is constructed (step S301).

The luminance histogram is acquired by a computer program calculation, and an image characteristic of the luminance histogram is analyzed therein (step S303).

Afterward, comparing a maximum with a mean value of the luminance, and then adjudging whether a peak wave in the luminance histogram is presented (step S305). Namely, the aforementioned peak wave is in the histogram if the result of the maximum of the luminance subtracts the mean value is larger than a default judging value.

If there is no peak wave in the histogram, a mean value of luminance is acquired by the computer program calculation according to equation 4 mentioned above (step S307).

Then a standard deviation of luminance is calculated according to the equation 5 mentioned above (step S309).

From the comparison between the mean value of luminance and an upper limit of luminance, if the mean value is bigger than the upper limit of luminance, the image is bright-shift; otherwise, the image is not bright-shift (step S311).

If the image is bright-shift, the control point is equal to the mean value of luminance subtracts the standard deviation of luminance (step S317).

On the other hand, if the image is not bright-shift, the dark-shift of the image will be judged. From the comparison between the mean value of luminance and a lower limit of luminance, if the mean value is smaller than the lower limit of luminance, the image is dark-shift, otherwise the image is not dark-shift (step S313).

If the image is dark-shift, the control point is equal to the sum of the mean value and the standard deviation of luminance up (step S319).

When the mean value of luminance is not smaller than the lower limit of luminance, and the mean value is also not larger than the upper limit of luminance, then the control point is equal to the mean value (step S315).

In step S305, a peak wave in the luminance histogram indicated that there is a major pure pattern on the background of the original image, and the peak wave of the luminance histogram is then clipped (step S321). The process of clipping the peak wave of the luminance histogram is to eliminate the interference from the background image as analyzing the original image's characteristic.

After that, a weight center of the clipped luminance histogram is acquired by the computer program calculation according to the equation 6 (step S323).

The abscissa of the weight center is then regarded as the control point (step S325).

Further, the control point also can be adjusted according to the luminance of image (step S327).

The x-coordinate in horizontal direction and the y-coordinate in vertical direction of the control point acquired from the step S315, S317, S319 and S327 are determined to be the same, and a gamma table is established in accordance with the control point and a contrast value to be adjusted (step S329).

The control point and the contrast value of the Cartesian coordinate system are given values, by which a linear equation shown in FIG. 2 is derived since the values are substituted into a two-variable equation, respectively. The linear equation is the mapping function connecting with the control point and the contrast value.

The abscissa of the Cartesian coordinate system shown in FIG. 2 stands for the input luminance of the original image, and the ordinate is the output luminance after processing the image contrast, therefore the output luminance can be acquired by mapping the input luminance in the linear equation. The gamma table is thus established.

Finally, an output luminance value through the contrast adjusting is reached. More particularly, the output luminance value corresponds to the input luminance of every pixel in the original image using the method of gamma look-up table (step S331).

The present invention provides the aforementioned method to process the image contrast with enhancement or abatement according to an image characteristic analyzed from the luminance histogram. In order to correspond with every different image characteristics, a control point is acquired under a suitable selection. After the control point is determined, a linear equation is derived corresponded with the input luminance desired to be adjusted, and a gamma table can be established according to all kinds of the input and output luminance. Finally, an output luminance value through the contrast adjusting method is reached.

Figure 4:
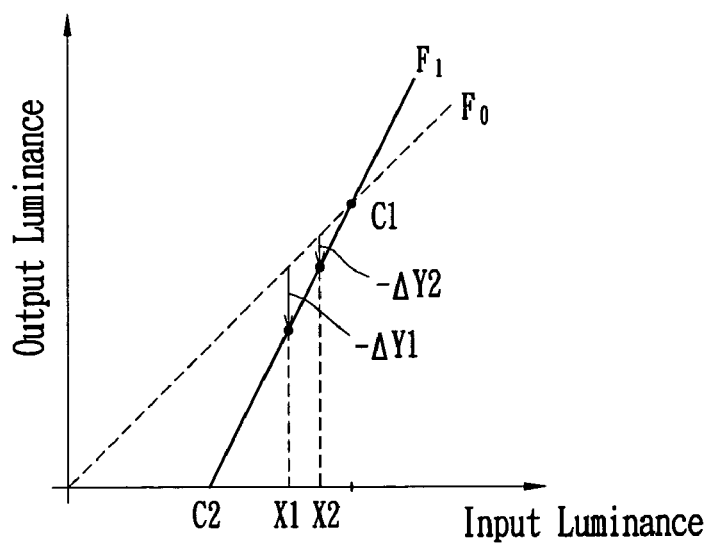
FIG. 4 shows a linear equation in the Cartesian coordinate of the present invention.

Reference is made to FIG. 4, which shows a linear equation in the Cartesian coordinate of the embodiment in the present invention. The control point is chosen as C1. A linear equation F0 is shown as the dotted line, and its contrast value is 0. A linear equation F1 is shown as solid line whose contrast value is adjusted to 30. Obviously, as the contrast value C2 is positive, X2>X1, but −ΔY2>−ΔY1; in other words, the linear equation F1 makes the pixel with a large luminance value become brighter, and the pixel with small luminance value become darker.

Figure 5A:
FIG. 5A shows an original image with a background image.
Figure 5B:
FIG. 5B shows a linear equation $F_1$ with image contrast adjusting using the image in FIG. 5A.

Next, since a gamma table is established according to the linear equation F1 mentioned above. The image shown in FIG. 5A is processed through the method for adjusting image contrast according to the gamma table and changed into the image shown in FIG. 5B. There is a large background pattern attached to the image in FIG. 5A, but the image in FIG. 5B is shifted toward a certain contrast value smoothly without influence of the background.

Figure 6A:
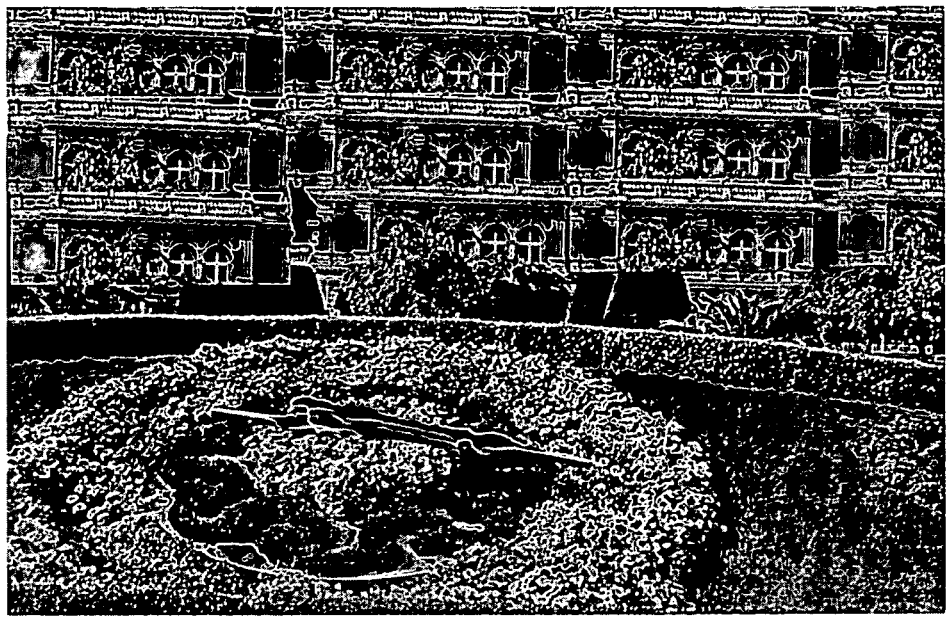
FIG. 6A shows an original image without a background image.
Figure 6B:
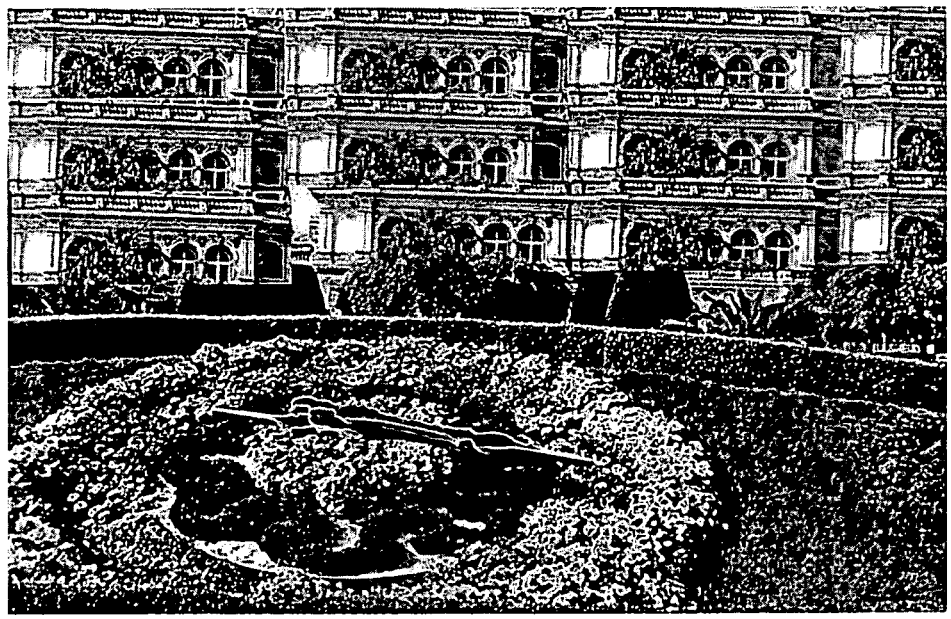
FIG. 6B shows a linear equation $F_1$ with image contrast adjusting using the image in FIG. 6A.

Similarly, another gamma table is established from the linear equation F1 shown in FIG. 4. The image in FIG. 6B is changed from the image in FIG. 6A processed through the method for adjusting image contrast. The luminance of the image in FIG. 6A is well distributed. No further distortion occurs in the image of FIG. 6B with the method for adjusting image contrast of the present invention. However, the pixel of the aforementioned image with a large luminance value becomes brighter, and the pixel with a small luminance value becomes darker.

Figure 7:
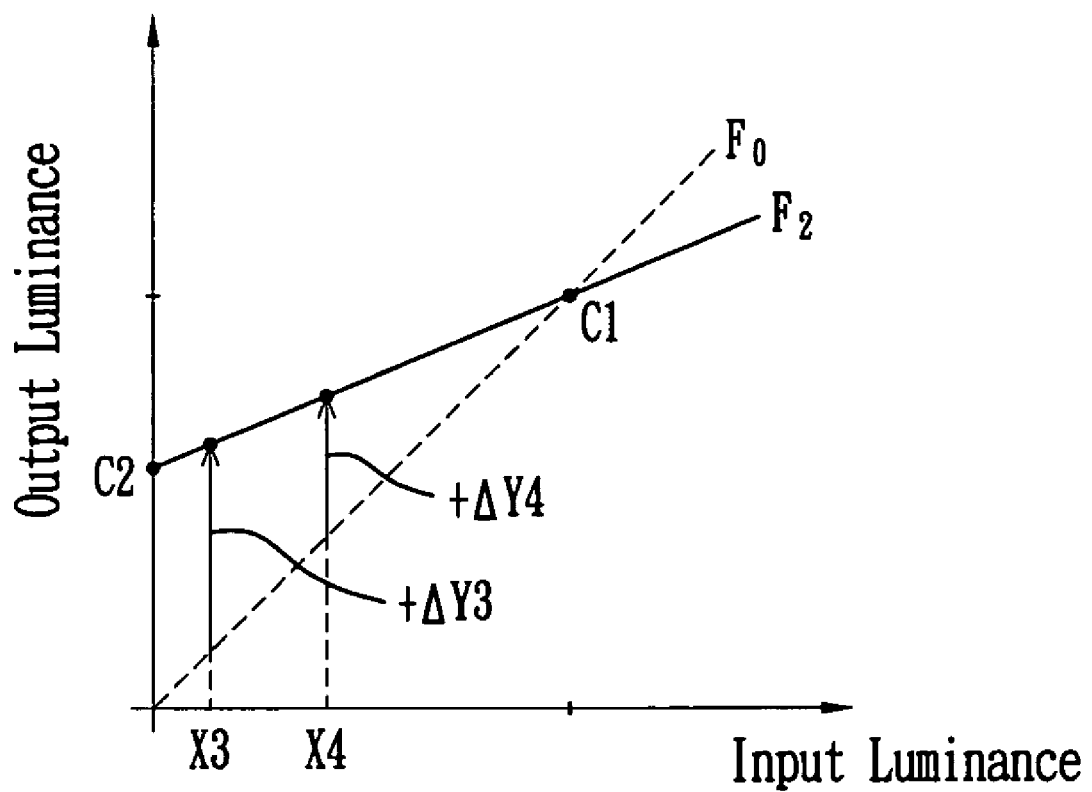
FIG. 7 shows a linear equation in the Cartesian coordinate of the present invention.

FIG. 7 shows a linear equation in the Cartesian coordinate of the present invention, where C1 is the chosen control point. A linear equation $F_0$ with 0 contrast value is shown as the dotted line and the contrast value of other linear equation $F_2$ shown as solid line is adjusted to −30. When the contrast value C2 is negative, X4>X3, but ΔY4<ΔY3; in other words, the linear equation $F_2$ makes the pixel with a large luminance value become darker, and the pixel with small luminance value become brighter.

In conclusion, the method for adjusting image contrast of the present invention has following improvements:

1. The present invention provides a method to process image contrast with enhancement or abatement according to an original image histogram for achieving ideal contrast effect.
2. The establishment of the gamma table is according to a linear equation for shortening the processing time.

The many features and advantages of the present invention are apparent from the written description above and it is intended by the appended claims to cover all. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for adjusting contrast of an image, the method comprising the steps of:
    constructing a luminance histogram of an original image;
    determining a control point by analyzing an image characteristic of the luminance histogram;
    acquiring a contrast value;
    deriving a linear equation by connecting the control point and the contrast value in a Cartesian coordinate system;
    establishing a gamma table according to the linear equation; and
    adjusting the contrast of the image according to the gamma table.

2. The method for adjusting contrast of an image as recited in claim 1, wherein the luminance histogram is obtained by computational calculation.

3. The method for adjusting contrast of an image as recited in claim 1, wherein the control point is a weight center obtained by clipping a peak wave of the luminance histogram.

4. The method for adjusting contrast of an image as recited in claim 1, wherein the control point is a luminance mean value of the luminance histogram.

5. The method for adjusting contrast of an image as recited in claim 1, wherein the control point is a result of the luminance mean value added to or subtracts a standard deviation of luminance of the luminance histogram.

6. The method for adjusting contrast of an image as recited in claim 1, wherein an abscissa of the Cartesian coordinate system stands for an input luminance of the original image, and an ordinate stands for an output luminance of the image after adjusting, and the gamma table is established in accordance with a relationship between the abscissa and the ordinate of the Cartesian coordinate system.

7. The method for adjusting contrast of an image as recited in claim 1, wherein the step of adjusting the contrast of the image acquires an output luminance value corresponding to an input luminance of every pixel in the image using the method of a look-up table.

8. A method for adjusting image contrast, the method comprising the steps of:
    constructing a luminance histogram of an original image;
    judging whether a peak wave is present in the luminance histogram;
    acquiring a clipped luminance histogram by clipping the peak wave of the luminance histogram;
    determining a control point, wherein the control point is a weight center calculated from the clipped luminance histogram;
    acquiring a contrast value;
    deriving a linear equation connecting the control point and the contrast value in a Cartesian coordinate system;
    establishing a gamma table according to the linear equation; and
    adjusting contrast of the original image according to the gamma table.

9. The method for adjusting image contrast as recited in claim 8, wherein the step of judging whether the peak wave is present in the luminance histogram compares a difference between a maximum luminance and a mean value of luminance with a peak wave reference value.

10. The method for adjusting image contrast as recited in claim 8, wherein the step of calculating the weight center determines an abscissa of the clipped luminance histogram as x, determining an ordinate as m, and determining a serial luminance value of the clipped luminance histogram is i, wherein i is in a range of about 0~255.

11. The method for adjusting image contrast as recited in claim 8, wherein the control point is a horizontal value of coordinates of the weight center in the Cartesian coordinate.

12. The method for adjusting image contrast as recited in claim 8, wherein the step of clipping the peak wave of the luminance histogram is to eliminate a background image of the original image.

13. The method for adjusting image contrast as recited in claim 8, wherein an abscissa of the Cartesian coordinate system stands for an input luminance of the original image, an ordinate stands for an output luminance of the original image after adjusting, and the gamma table is established in accordance with a relationship between the abscissa and the ordinate of the Cartesian coordinate system.

14. The method for adjusting image contrast as recited in claim 8, wherein the step of adjusting the contrast of the original image acquires an output luminance value corresponding to an input luminance of every pixel in the original image using the method of look-up table.

15. A method for adjusting image contrast, the method comprising the steps of:
    constructing a luminance histogram of an original image;
    calculating a mean value of luminance and a standard deviation of luminance;
    judging whether the mean value of luminance is bright-shift or dark-shift;

determining a control point through operation of the mean value of luminance and the standard deviation of luminance;

acquiring a contrast value;

deriving a linear equation connecting the control point and the contrast value in a Cartesian coordinate system;

establishing a gamma table according to the linear equation; and adjusting a contrast of the original image according to the gamma table.

16. The method for adjusting image contrast as recited in claim 15, wherein the step of judging whether the mean value of luminance is bright-shift or dark-shift compares the mean value of luminance with an upper limit of the luminance.

17. The method for adjusting image contrast as recited in claim 16, wherein the control point is the result of subtracting the standard deviation of luminance from the mean value of luminance when the mean value is larger than the upper limit.

18. The method for adjusting image contrast as recited in claim 15, wherein the step of judging whether the mean value of luminance is bright-shift or dark-shift compares the mean value of luminance with a lower limit of the luminance.

19. The method for adjusting image contrast as recited in claim 18, wherein the control point is a result of adding the mean value of luminance and the standard deviation of luminance when the mean value is smaller than the lower limit.

20. The method for adjusting image contrast as recited in claim 15, wherein the step of judging whether the mean value of luminance is bright-shift or dark-shift compares the mean value with an upper limit and a lower limit of the luminance.

21. The method for adjusting image contrast as recited in claim 20, wherein the control point is equal to the mean value of luminance when the mean value is located in a midst of the upper limit and the lower limit of the luminance.

22. The method for adjusting image contrast as recited in claim 15, wherein an abscissa of the Cartesian coordinate system stands for an input luminance of the original image, and an ordinate stands for an output luminance of the original image after adjusting, and the gamma table is established in accordance with the relationship between the abscissa and the ordinate of the Cartesian coordinate system.

23. The method for adjusting image contrast as recited in claim 15, wherein the step of adjusting the contrast of the original image acquires an output luminance value corresponding to an input luminance of every pixel in the original image using a method of look-up table.

* * * * *